Figure 1:
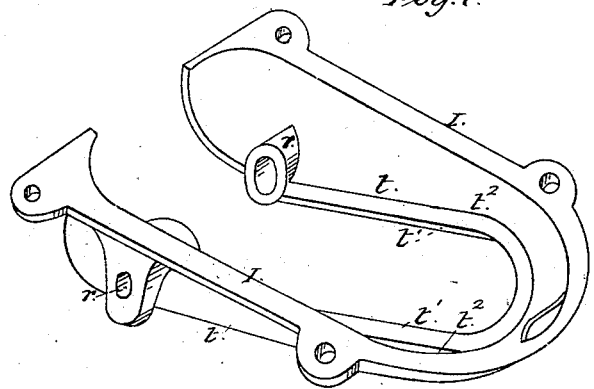
Figure 2:
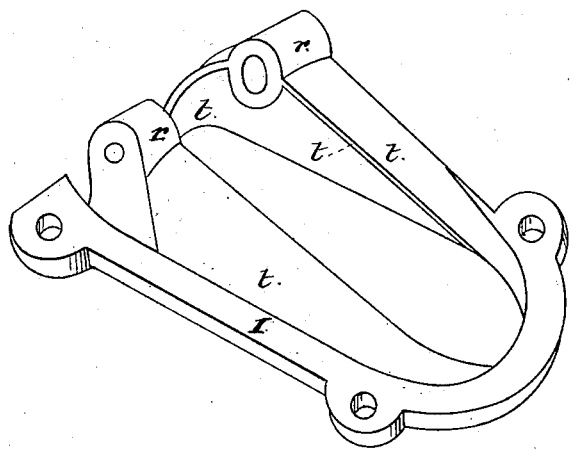

R. M. LAFFERTY.
HANDLE BRACKET FOR PUMPS.

No. 272,889. Patented Feb. 27, 1883.

Witnesses:
E. P. Hough.
R. Brown.

R. M. Lafferty,
Inventor;
Louis Feeser & Co.
Attorneys
per Chas. J. Gooch
Associate

UNITED STATES PATENT OFFICE.

ROBERT M. LAFFERTY, OF ST. PAUL, MINNESOTA.

HANDLE-BRACKET FOR PUMPS.

SPECIFICATION forming part of Letters Patent No. 272,889, dated February 27, 1883.

Application filed October 17, 1878.

*To all whom it may concern:*

Be it known that I, ROBERT MCDOWELL LAFFERTY, of St. Paul, in the county of Ramsey and State of Minnesota, have invented certain new and useful Improvements in Handle-Brackets for Pumps, which improvements are fully set forth in the following specification and accompanying drawings, in which—

Figure I is an inside perspective view of my improved bracket, and Fig. II an outside perspective view of the same.

Similar letters denote like parts in both figures.

This invention relates to pump-handle brackets; and it consists in the construction hereinafter particularly described, and then sought to be specifically defined by the claim.

I is a U-shaped plate, made either in one or two pieces, and provided with bearings $r$, through which the pin passes, and which are connected to the plate I by curved and particircular webs or braces $t$. By this manner of forming the handle-bracket—viz., by curving or slanting the webs or braces $t$—I am enabled to make the parting in the sand, when they are cast, along the upper edge of the base I, and around the edge $t'$ of the slot, through which the handle passes, and through the center of the bearings $r$, thereby enabling the holes for the pin through the bearings to be cored out, thus saving the expense and labor of boring. Another advantage resulting from this arrangement is, that by curving the webs they are made much stronger than if they were straight. Consequently they may be made as thin as the iron will run and still be amply strong for the purpose for which they are intended. They may, moreover, be made of malleable iron, and yet by their lightness be as cheap as ordinary cast-iron. Another advantage is that the bearings $r$ may be lengthened without materially affecting the weight of the metal, which is a great advantage in some cases.

A small rib, $t^2$, may be formed upon the under side of the slot, through which the handle passes, to afford additional strength to the bracket, if desired.

I am aware that it is not new to cast U-shaped brackets for pump-handles, and lay no claim broadly to brackets so made; but, Having described the construction and advantages of my improved bracket, what I claim as new, and desire to secure by Letters Patent, is—

The U-shaped bracket I, having the web $t$ extending out from its base and made concave on its inside, as shown, and provided with the bearings $r$ at the crown of the web, whereby the bracket can be formed as set forth, for the purpose specified.

In testimony whereof I have hereunto set my hand in the presence of two subscribing witnesses.

ROBERT McDOWELL LAFFERTY.

Witnesses:
C. N. WOODWARD,
LOUIS FEESER.